US008468800B2

(12) United States Patent
Hatamura

(10) Patent No.: US 8,468,800 B2
(45) Date of Patent: Jun. 25, 2013

(54) SECONDARY AIR AND EXHAUST GAS RECIRCULATION FOR A FOUR-STROKE INTERNAL COMBUSTION ENGINE

(76) Inventor: Koichi Hatamura, Yachiyo (JP)

( * ) Notice: Subject to any disclaimer, the term of this patent is extended or adjusted under 35 U.S.C. 154(b) by 866 days.

(21) Appl. No.: 12/526,614

(22) PCT Filed: Feb. 6, 2008

(86) PCT No.: PCT/JP2008/051918
§ 371 (c)(1),
(2), (4) Date: Aug. 10, 2009

(87) PCT Pub. No.: WO2008/096774
PCT Pub. Date: Aug. 14, 2008

(65) Prior Publication Data
US 2010/0116255 A1 May 13, 2010

(30) Foreign Application Priority Data
Feb. 9, 2007 (JP) .................................. 2007-031132

(51) Int. Cl.
*F02M 25/06* (2006.01)
(52) U.S. Cl.
USPC ................... 60/278; 60/274; 60/280; 60/293; 123/568.11; 123/568.14
(58) Field of Classification Search
USPC ................. 60/278, 280, 289, 290; 123/90.15, 123/90.16, 90.17, 568.11, 568.14
See application file for complete search history.

(56) References Cited

U.S. PATENT DOCUMENTS

| 4,312,313 | A | * | 1/1982 | McWhorter | 123/433 |
|---|---|---|---|---|---|
| 5,425,346 | A | * | 6/1995 | Mavinahally | 123/568.13 |
| 5,740,785 | A | * | 4/1998 | Dickey et al. | 123/568.12 |
| 5,819,693 | A | | 10/1998 | Curtil | |

(Continued)

FOREIGN PATENT DOCUMENTS

| EP | 1811154 A1 | 7/2007 |
|---|---|---|
| JP | 51-34526 B | 9/1976 |

(Continued)

OTHER PUBLICATIONS

Kanesaka, H., "New Starting Aid for Low Compression Ratio Diesel Engines", 1980, pp. 1-7, No. 80-DGP-8, The American Society of Mechanical Engineers.

(Continued)

*Primary Examiner* — Thomas Denion
*Assistant Examiner* — Jesse Bogue
(74) *Attorney, Agent, or Firm* — Smith Patent Office

(57) ABSTRACT

A four-stroke engine (1) structured to introduce fresh air and EGR gas into a cylinder (1a) includes a blowdown supercharging system (40) using a combustion chamber internal pressure when exhaust valves open in an expansion stroke of a first cylinder (hereinafter denoted as an exhaust blowdown pressure) for introducing EGR gas into a second cylinder from near a bottom dead center of an intake stroke to near a bottom dead center of a compression stroke of the second cylinder which is different from the first cylinder in combustion timing, and a secondary air supply system (20) supplying secondary air to an exhaust port (1e) of the second cylinder prior to arrival of the exhaust blowdown pressure at the second cylinder. The secondary air in the exhaust port and the EGR gas are supercharged into the second cylinder by the exhaust blowdown pressure from the first cylinder.

4 Claims, 12 Drawing Sheets

U.S. PATENT DOCUMENTS

| | | | |
|---|---|---|---|
| 6,094,909 A * | 8/2000 | Weber et al. | 60/280 |
| 6,308,666 B1 | 10/2001 | Drecq | |
| 6,827,067 B1 * | 12/2004 | Yang et al. | 123/568.14 |
| 7,753,037 B2 * | 7/2010 | Hatamura | 123/568.13 |
| 7,819,101 B2 * | 10/2010 | Poola et al. | 123/90.6 |
| 7,980,232 B2 * | 7/2011 | Higaki et al. | 123/568.13 |
| 2005/0081836 A1 * | 4/2005 | Winsor | 123/568.14 |

FOREIGN PATENT DOCUMENTS

| | | |
|---|---|---|
| JP | 2004-11557 A | 1/2004 |
| JP | 2004-11620 A | 1/2004 |
| JP | 2006-283668 A | 10/2006 |
| JP | 2006-283670 A | 10/2006 |
| WO | 2006/043502 A1 | 4/2006 |

OTHER PUBLICATIONS

Supplementary European Search Report, directed to European Patent Application No. 08704489.7, 6 pages, mailed Mar. 21, 2011.

* cited by examiner (a)     (b)

SECONDARY AIR AND EXHAUST GAS RECIRCULATION FOR A FOUR-STROKE INTERNAL COMBUSTION ENGINE

TECHNICAL FIELD

The present invention relates to a four-stroke engine structured to introduce fresh air (secondary air) and EGR gas into a cylinder, and more particularly relates to a four-stroke engine capable of securing the introduced amount of EGR gas while compensating reduction in the introduced amount of fresh air by secondary air with a simple structure. Note that in the present description, air introduced into a cylinder via an intake port is referred to as fresh air, and air introduced into a cylinder via an exhaust port is referred to as secondary air.

BACKGROUND ART

For an exhaust gas of a diesel engine, reduction of nitrogen oxides (NOx) and soot is one of the most important problems. Introduction of EGR gas is effective as a countermeasure for NOx in a medium load operation (acceleration), but the fresh air decreases and the soot increases in normal EGR. As a conventional technique capable of solving this problem, there is one using an exhaust blowdown pressure near the bottom dead center of an expansion stroke of one cylinder to supercharge EGR gas into another cylinder which is different from the one cylinder in combustion timing (see Patent Document 1), or one using an exhaust pressure by an exhaust throttle to supercharge the EGR gas (see Non-patent Document 1).
[Patent Document 1] Japanese Patent Publication No. S51-34526
[Non-patent Document 1] ASME80-DGP-8

DISCLOSURE OF THE INVENTION

Problems to be Solved by the Invention

The engine in aforementioned Patent Document 1 requires a complicated structure such as an exhaust rotary valve, and has not been turned into practical use. Further, although the engine in aforementioned Non-patent Document 1 allows to increase the amount of EGR gas, decrease in the intake amount of fresh air is inevitable.

An object of the present invention is to provide a four-stroke engine capable of widening the operation range to a high load side for a natural aspiration gasoline HCCI engine or a mechanically supercharged HCCI engine, and capable of increasing transient torque for a turbocharged HCCI gasoline or diesel engine, by replacing a part of EGR gas with secondary air.

Note that in the present description, the HCCI engine means a homogenous charge compression ignition engine. In a normal diesel engine, fuel is supplied by injection near the compression top dead center, whereas in the HCCI engine, fuel is injected earlier into a combustion chamber or mixed with air in an intake port, and the premixed gas is auto-ignited near the compression top dead center by combustion reaction at a compression temperature.

Means for Solving the Problems

In an invention of claim 1, a four-stroke engine structured to introduce fresh air and EGR gas into a cylinder includes a blowdown supercharging system using a combustion chamber internal pressure when exhaust valves open in an expansion stroke of a first cylinder (hereinafter denoted as an exhaust blowdown pressure) for introducing EGR gas into a second cylinder from near a bottom dead center of an intake stroke to near a bottom dead center of a compression stroke of the second cylinder which is different from the first cylinder in combustion timing, and a secondary air supply system supplying secondary air to an exhaust port of the second cylinder prior to arrival of the exhaust blowdown pressure at the second cylinder. The secondary air in the exhaust port and the EGR gas are supercharged into the second cylinder by the exhaust blowdown pressure from the first cylinder.

Here, in the present invention, the "introducing EGR gas into a second cylinder from near a bottom dead center of an intake stroke to near a bottom dead center of a compression stroke of the second cylinder" includes that the EGR gas is introduced in at least a part of a range from near the bottom dead center of an intake stroke to near the bottom dead center of a compression stroke.

In the invention of claim 1, the exhaust blowdown pressure from the first cylinder arrives at the exhaust port of the second cylinder, in a state that the secondary air is supplied to the exhaust port of the second cylinder. Therefore, this results in that EGR gas is supercharged into the second cylinder together with the secondary air replaced with a part of the EGR gas, and the EGR gas amount can be secured while reduction of the fresh air amount is compensated by the secondary air.

In an invention of claim 2 according to claim 1, the secondary air supply system includes a secondary air supply path connecting an intake system and the exhaust port of each cylinder in a communicative manner, a secondary air control valve interposed in the secondary air supply path, and an auxiliary supercharger interposed upstream of a secondary air control valve in the secondary air supply path and driven by an electric motor or engine output.

When the invention of claim 2 is applied to, for example, a naturally aspirated gasoline HCCI engine, secondary air is supplied to the exhaust port through the secondary air supply path by the auxiliary supercharger for example in a medium load operation range, and the secondary air in the exhaust port is supercharged together with EGR gas. That is, the amount of low-temperature air increases by the added amount of the secondary air to the fresh air, and the amount of high-temperature EGR gas is increased corresponding to raising of the temperature of the low-temperature air. Thus, the mass (thermal capacity) of air-fuel mixture introduced into a cylinder increases. As a consequence, the combustion temperature decreases and the amount of generating NOx is suppressed, and thus the HCCI operation range can be widened further to a high load side. When the secondary air control valve interposed in the secondary air supply path is electronically controlled type, the introduced amount of secondary air can be controlled for every cylinder and every cycle of HCCI, and thereby the combustion timing can be controlled for every cylinder and every cycle.

In an invention of claim 3 according to claim 1, the engine includes an intake system in which a main supercharger driven by an electric motor or engine output is interposed, and is structured to supply compressed fresh air at atmospheric pressure or higher into each cylinder, and the secondary air supply system is structured to allow the compressed fresh air supplied from the intake system to flow through to the exhaust port side in an overlap period in which both exhaust valves and intake valves are open, to thereby supply the compressed fresh air into the exhaust port.

Here, in the present invention, the "overlap period in which both exhaust valves and intake valves are open" includes both a period in which the exhaust valves and the intake valves are both open in a range from the end of an exhaust stroke to the beginning of an intake stroke and a period in which the intake valves are open and the exhaust valves are open for introducing EGR gas in the end of an intake stroke.

When the invention of claim 3 is applied to, for example, an HCCI mechanically supercharged engine performing HCCI operation for a medium load and SI (spark ignition) operation for a high load, part of fresh air introduced into the first cylinder from the intake system via the intake valves is supplied into the exhaust port of the first cylinder from the exhaust valve via the cylinder in the aforementioned overlap period. The secondary air supplied to the exhaust port side is supercharged into the first cylinder together with EGR gas by the exhaust blowdown pressure from the second cylinder. Accordingly, the mass of in-cylinder air-fuel mixture increases more than in the same supercharging pressure operation in a simple supercharged engine in which fresh air is supercharged from an intake system just by a main supercharger, and thus the HCCI operation range can be widened while suppressing the mechanical loss. That is, the amount of fresh air increases while the supercharging pressure is the same, and thus the supercharging pressure can be reduced by the amount of fresh air at a high load limit. Consequently, increase in mechanical loss by driving the mechanical supercharger can be suppressed.

In an invention of claim 4 according to claim 1, the engine includes an intake system in which a turbocharger driven by exhaust gas from the engine is interposed, and is structured to supply compressed fresh air at atmospheric pressure or higher into each cylinder at least in a high load operation range, and the secondary air supply system includes a secondary air supply path connecting an intake system and the exhaust port of each cylinder in a communicative manner, a secondary air control valve interposed in the secondary air supply path, and an auxiliary supercharger interposed upstream of a secondary air control valve in the secondary air supply path and driven by an electric motor or engine output.

In a turbocharged engine, in a period of turbo lag in which the rotational speed of the turbocharger is not sufficient, increase in the intake port internal pressure is delayed, and thus a delay occurs in increase of the intake air amount. Moreover, the exhaust pressure becomes higher than the intake pressure, and generation of torque is further delayed due to increase in residual gas and increase in pumping loss. In the invention of claim 4, secondary air is supplied to the exhaust port by the auxiliary supercharger, so as to supercharge EGR gas together with this secondary air by an exhaust blowdown pressure. Thus, transient torque can be increased by increasing the fuel injection amount by the amount of increased secondary air. Consequently, turbine charging energy supplied to the turbocharger increases, and rotation increase speed of the turbocharger increases. Accordingly, the response of the turbocharger can be improved.

In an invention of claim 5 according to any one of claims 1 to 4, in the blowdown supercharging system, an exhaust timing of the first cylinder and exhaust pipe lengths from the first cylinder to the second cylinder are set so that the exhaust blowdown pressure of the first cylinder arrives at the exhaust port of the second cylinder near an intake stroke bottom dead center of the second cylinder, and exhaust valves of the second cylinder are structured to open near the intake stroke bottom dead center of the second cylinder.

In the invention of claim 5, since the exhaust blowdown pressure of the first cylinder arrives at the exhaust port of the second cylinder near the intake stroke bottom dead center of the second cylinder, and exhaust valves of the second cylinder open near the intake stroke bottom dead center of the second cylinder, EGR gas can be supercharged together with the secondary air supplied to the exhaust port into the secondary cylinder by the exhaust blowdown pressure, thereby realizing the above-described effect.

Figure 1:
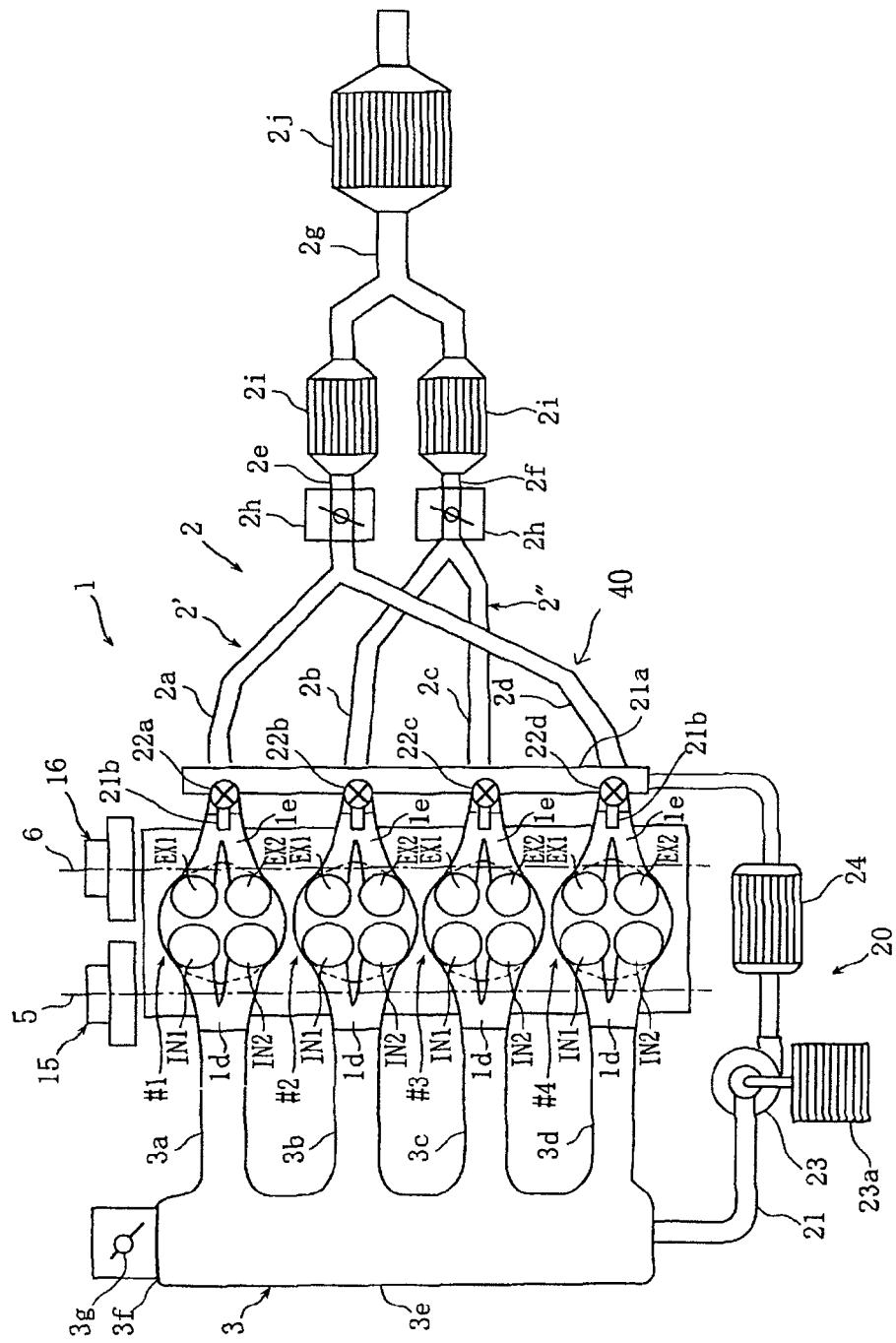
FIG. 1 is a schematic structural view of an engine according to a first embodiment of the present invention.

EXPLANATION OF NUMERALS AND SYMBOLS 1a cylinder bore (cylinder)
1e exhaust port
2a, 2d exhaust pipe
20 secondary air supply system
21 secondary air supply path
22a to 22d secondary air control valve
23 auxiliary supercharger
31 main supercharger
36 turbocharger
40 blowdown supercharging system
IN intake valve
EX exhaust valve
1 cylinder (second cylinder)
4 cylinder (first cylinder)

BEST MODE FOR CARRYING OUT THE INVENTION

Hereinafter, embodiments of the present invention will be described based on the attached drawings.

Figure 2:
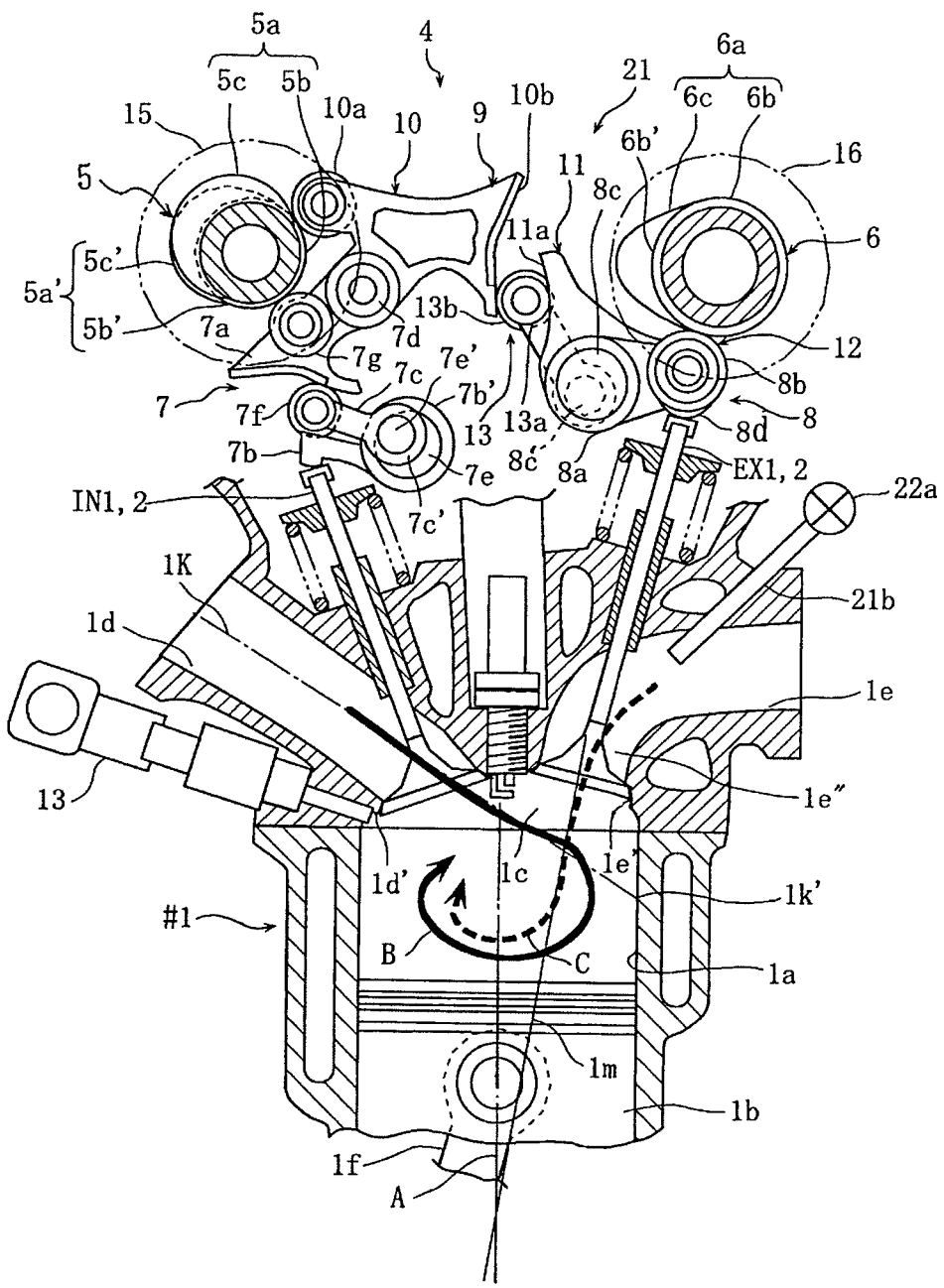
FIG. 2 is a cross-sectional side view of the engine of the first embodiment.
Figure 3:
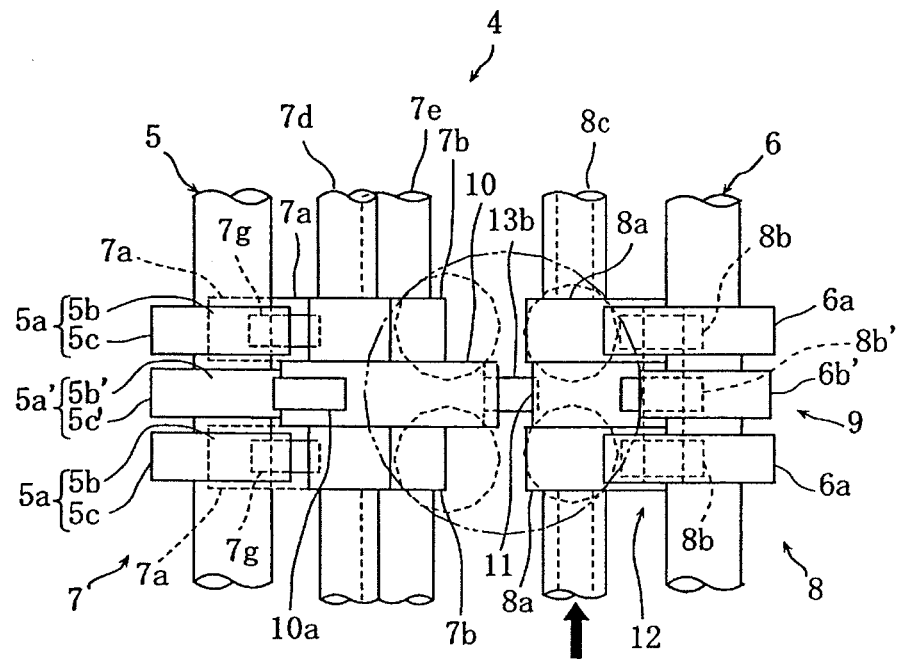
FIG. 3 is a schematic plan view of a valve device of the engine of the first embodiment.
Figure 4:
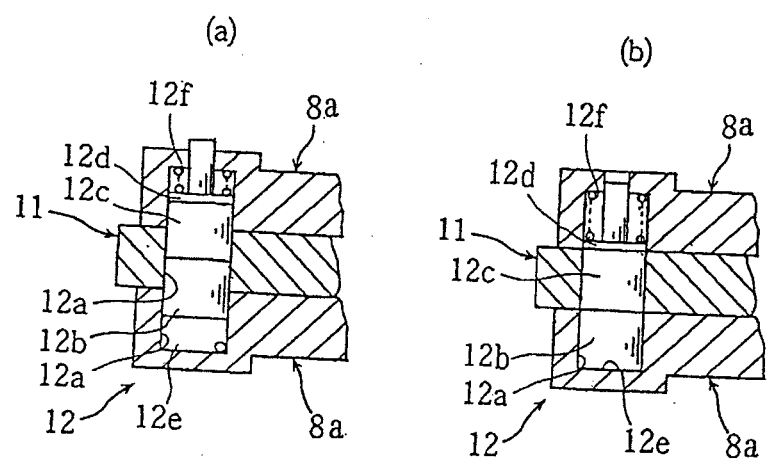
FIG. 4 are schematic cross-sectional views of a switching system of the engine of the first embodiment.
Figure 5:
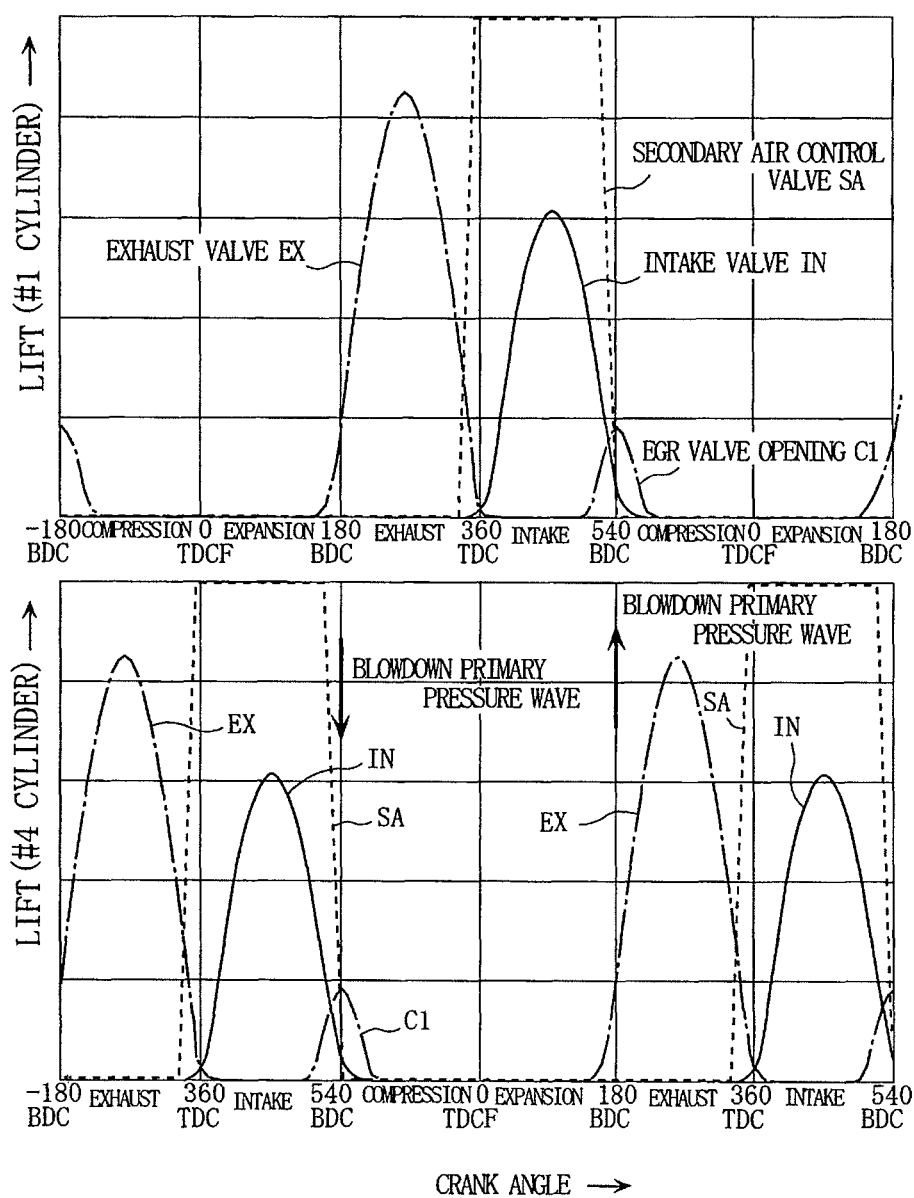
FIG. 5 is a graph showing timings of opening/closing of intake valves, exhaust valves, and a secondary air control valve of the engine of the first embodiment.
Figure 6:
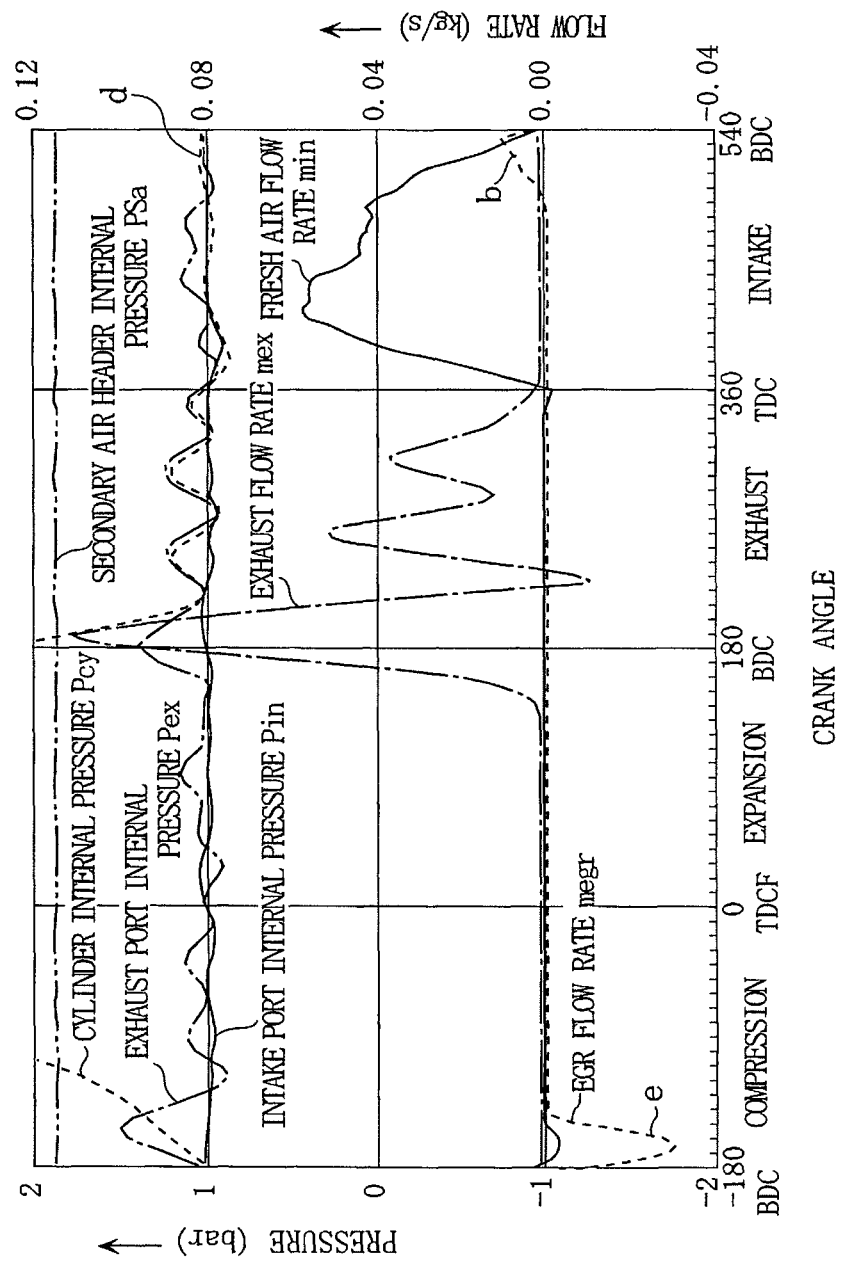
FIG. 6 is a characteristic graph of various pressures and flow rates of the engine of the first embodiment.
Figure 7:
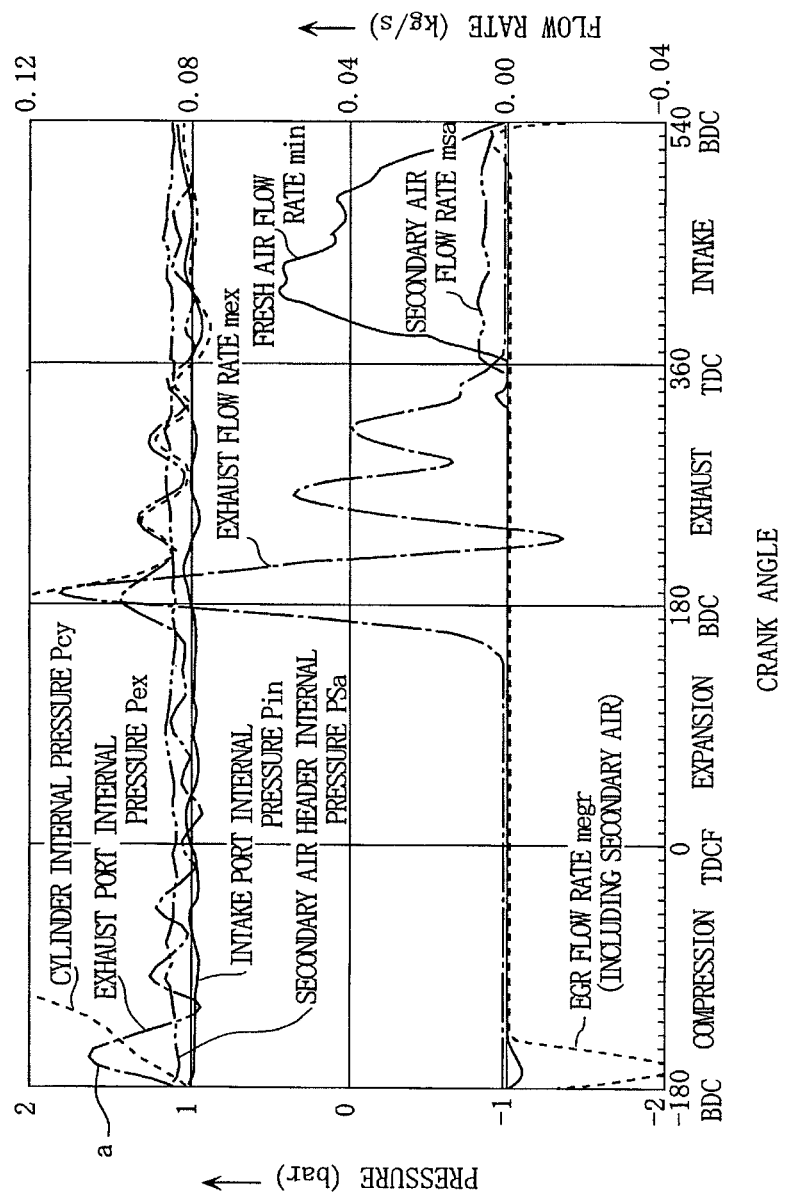
FIG. 7 is a characteristic graph of various pressures and flow rates of the engine of the first embodiment.

FIG. 1 to FIG. 7 are views for describing a four-stroke engine according to a first embodiment of the present invention. FIG. 1 is an overall structural view. FIG. 2 is a cross-sectional side view of this engine. FIG. 3 is a schematic plan view of a valve system. FIG. 4 are schematic views of a switching system. FIG. 5 to FIG. 7 are graphs for describing operations.

In the drawings, numeral 1 denotes an HCCI engine based on a four-cylinder, four-valve DOHC gasoline engine. This engine 1 includes #1 cylinder to #4 cylinder. The #1 cylinder to #4 cylinder each have four valves in total: two intake valves IN1, IN2 and two exhaust valves EX1, EX2. Further, the engine 1 includes in-cylinder gasoline injection valves 13, and has a compression ratio set to 12 which is optimal for spark ignition combustion.

The order of ignition in the engine 1 is #1-#3-#4-#2 cylinders. The phase between the cylinders (ignition interval) is 180 degrees in crankshaft angles. Therefore, the phase between the #1 cylinder and the #4 cylinder and the phase between the #2 cylinder and the #3 cylinder are 360 degrees each. Note that the piston positions of the #1 cylinder and the #4 cylinder are always the same, and the piston positions of the #2 cylinder and the #3 cylinder are always the same. The piston positions of the #1 cylinder and the #4 cylinder are different by 180 degrees from the piston positions of the #2 cylinder and the #3 cylinder.

The specific structure of the engine 1 will be described. In a cylinder bore 1a of each of the #1 to #4 cylinders, a piston 1b is inserted slidably, and the piston 1b is coupled to a crankshaft (not shown) by a connecting rod 1f. In a combustion chamber 1c located above the cylinder bore 1a, there open two intake valve openings 1d' of an intake port 1d, and two exhaust valve openings 1e' of an exhaust port 1e. These openings are opened/closed by the intake valves IN1, IN2 and the exhaust valves EX1, EX2.

The intake valves IN1, IN2 and the exhaust valves EX1, EX2 are driven to open/close by a valve device 4. This valve device 4 has an intake valve drive system 7 capable of sequentially changing open durations and lift amounts of the intake valves IN1, IN2, and an exhaust valve drive system 8 for opening/closing the exhaust valves EX1, EX2.

The exhaust valve drive system 8 includes an exhaust cam shaft 6 and an exhaust rocker shaft 8c which are arranged in parallel to the crankshaft, an exhaust rocker arms 8a, 8a pivotally and rockably supported by the exhaust rocker shaft 8c, and rollers 8b pivotally supported on tip portions of the rocker arms 8a. On the exhaust cam shaft 6, exhaust cam noses 6a each having a base circular portion 6b and a lift portion 6c are formed corresponding to the exhaust valves.

Rotation of the exhaust cam shaft 6 causes the exhaust cam noses 6a to rock the rocker arms 8a vertically via the rollers 8b, and tip portions 8d of the rocker arms 8a push down the exhaust valves EX in an opening direction.

The intake valve drive system 7 includes an intake cam shaft 5, an intake rocker shaft 7e, and a support shaft 7d which are arranged in parallel to the crankshaft, rocker cams 7a supported rockably by the support shaft 7d, and intake rocker arms 7b driven rockably by the rocker cams 7a via intake control arms 7c. On the intake cam shaft 5, intake cam noses 5a are formed corresponding to the intake valves of the respective cylinders. The intake cam noses 5a each have a base circular portion 5b and a lift portion 5c.

A base end portion 7b' in a ring shape of each intake rocker arm 7b is pivotally supported by the intake rocker shaft 7e. A base end portion 7c' in a ring shape of each intake control arm 7c is pivotally supported by an arm support shaft 7e' eccentric from the axial center of the intake rocker shaft 7e. When the intake rocker shaft 7e is rotated, the intake control arms 7c move forward and backward. This changes the start position of slide contact of rollers 7f with the rocker cams 7a at tip portions, and thereby changes the open periods and lift amounts of the intake valves.

When the intake cam shaft 5 is rotated, the intake cam noses 5a of the intake cam shaft 5 rock the intake rocker arms 7b vertically via the rocker cams 7a and the intake control arms 7c, and tip portions of the rocker arms 7b push down the intake valves IN1, IN2 in an opening direction.

Here, each intake port 1d has a shape and so on set so as to generate a fresh air tumble flow B such that, as shown by a bold solid line in FIG. 2, an intake air flow (fresh air flow) flows into the exhaust valve side across a cylinder axis A and flows down along the cylinder axis A on the exhaust valve side, and turns around on top of the piston and ascends on the intake valve side. Specifically, when seen in the cam shaft direction, each intake port 1d is formed in a substantially linear shape, and a center axis 1k thereof is directed to a portion 1k' near the exhaust valve openings across the cylinder axis A on an inner peripheral face of the cylinder bore 1a, thereby directing the fresh air flow to the exhaust valve side.

On the other hand, each exhaust port 1e has a shape and so on set so as to generate an exhaust tumble flow C such that, as shown by a bold solid dashed line in FIG. 2, an exhaust gas reverse flow (EGR gas flow) flows down along the cylinder axis A on the exhaust valve side, and turns around on top of the piston and ascends on the intake valve side. Specifically, an exhaust valve opening near portion 1e" near an exhaust valve opening 1e' of the exhaust port 1e is bent to be directed along the cylinder shaft A. More particularly, when seen in the cam shaft direction, the exhaust valve opening near portion 1e" is bent to such a degree that a center axis 1m thereof crosses the cylinder axis A below the top of the piston 1b located at the bottom dead center.

An intake device 3 connected to the engine 1 has a surge tank 3e having a predetermined volume and branch pipes 3a to 3d branched from the surge tank 3e and connected to the respective intake ports 1d of the #1 cylinder to #4 cylinder. An intake throttle valve 3g is disposed on an intake port 3f formed on one end of the surge tank 3e. An air cleaner (not shown) is connected upstream of the intake throttle valve 3g.

Further, an exhaust system 2 connected to the engine 1 has branch pipes 2a, 2d, 2b, 2c of the respective cylinders with lengths being set relatively long, and is what is called a 4-2-1 exhaust system having a first exhaust system 2' coupling and exhausting the #1 cylinder and the #4 cylinder with the phase (ignition interval) of 360 degrees, and a second exhaust system 2" coupling and exhausting the #2 cylinder and the #3 cylinder with the phase of 360 degrees similarly. This system allows to avoid exhaust interference in a high load operation range, and thus is suitable for increasing output.

The first exhaust system 2' has the first, fourth branch pipes 2a, 2d connected to the exhaust ports 1e of the #1 cylinder and the #4 cylinder, and a first merging pipe 2e merging the branch pipes 2a, 2d. The second exhaust system 2" has the second, third branch pipes 2b, 2c connected to the exhaust ports 1e of the #2 cylinder and the #3 cylinder, and a second merging pipe 2f merging the branch pipes 2b, 2c. Then the first, second merging pipes 2e, 2f merge with a main pipe 2g.

Further, upstream catalysts 2i, 2i are interposed in the first, second merging pipes 2e, 2f respectively, and a downstream catalyst 2j is interposed in the main pipe 2g. Moreover, exhaust throttles 2h, 2h variably controlling an exhaust passage area are interposed upstream of the upstream catalysts 2i in the second merging pipes 2e, 2f respectively.

The engine of this embodiment has a blowdown supercharging system 40 using a combustion chamber internal pressure (exhaust blowdown pressure) near the expansion stroke bottom dead center of the #4 cylinder (first cylinder) for introducing EGR gas into the #1 cylinder (second cylinder) near the intake stroke bottom dead center of the #1 cylinder which is different from the #4 cylinder in combustion timing by 360 degrees, and a secondary air supply system 20 supplying secondary air to the exhaust port 1e of the #1 cylinder and storing the secondary air, therein prior to arrival of the exhaust blowdown pressure at the #1 cylinder. The engine is structured to supercharge the secondary air stored in the exhaust port 1e and the EGR gas into the #1 cylinder by the exhaust blowdown pressure from the #4 cylinder.

In addition, the blowdown supercharging system 40 and the secondary air supply system 21 are structured to supercharge secondary air and EGR gas into the #4 cylinder using the exhaust blowdown pressure from the #1 cylinder, and further structured to supercharge secondary air and EGR gas into the #3 cylinder using the exhaust blowdown pressure from the #2 cylinder and to supercharge conversely secondary air and EGR gas into the #2 cylinder using the exhaust blowdown pressure from the #3 cylinder. The relationship between the #1 cylinder and the #4 cylinder will be described in detail below.

The blowdown supercharging system 40 is realized by shifting the combustion timing by 360 degrees between the #1 cylinder and the #4 cylinder, setting the lengths of the exhaust branch pipes 2a, 2d between the both cylinders so that the exhaust blowdown pressure from the #4 cylinder reaches the exhaust port of the #1 cylinder near the intake stroke top dead center of the #1 cylinder, and further having an EGR valve opening system 9 which opens the exhaust valves EX1, EX2 of the #1 cylinder again by the intake cam shaft 5, as shown by a lift curve C1 in FIG. 5, near the bottom dead center of an intake stroke of the #1 cylinder.

The EGR valve opening system 9 has EGR cam noses a' formed on the intake cam shaft 5, exhaust rocker cams 10 pivotally supported by the support shaft 7d, intermediate levers 11 pivotally supported by the exhaust rocker shaft 8c, exhaust control arms 13 pivotally supported by an arm support shaft 8c' which is eccentric from the shaft center of the exhaust rocker shaft 8c, and EGR guide cams 6b' formed on the exhaust cam shaft 6.

Each EGR cam nose 5a' on the intake cam shaft 5 side is formed between two intake cam noses 5a, 5a of the intake cam shaft 5. This EGR cam nose 5a' has an EGR base circular portion 5b' with the same diameter as that of the base circular portion 5b on the intake side, and an EGR lift portion 5c' with a smaller lift amount than that of the lift portion 5c on the intake side.

Further, each EGR guide cam 6b' on the exhaust cam shaft 6 side has the same diameter as that of the base circular portions 6b of the exhaust cam noses 6a. Incidentally, this EGR guide cam 6b' is formed of only a base circular portion and has no lift portion.

A roller 10a is disposed on one side across the support shaft 7d of each exhaust rocker cam 10, and a cam face 10b is formed on the other side thereof. The roller 10a is in rotary contact with the EGR cam nose 5a', and a roller 13b of the exhaust control arm 13 is in rotary contact with the cam face 10b.

Each intermediate lever 11 forms a substantially triangle shape, and a vertex angle portion of this triangle is supported rockably by the exhaust rocker shaft 8c. Further, a roller 8b is pivotally supported by one base angle portion of the triangle, and a cam face 11a is formed on an oblique side continuous to the other base angle portion. The roller 8b is in rotary contact with the EGR guide cam 6b', and a press portion 13a formed on a tip of the exhaust control arm 13 is in slide contact with the cam face 11a.

Here, between the intermediate lever 11 and two exhaust rocker levers 8a, 8a, there is formed a switching system 12 capable of switching to one of an EGR valve opening ON state, in which rocking of the intermediate lever 11 is transmitted to the exhaust rocker levers 8a, 8a, and an EGR valve opening OFF state in which the rocking is not transmitted.

The switching system 12 has a structure in which, as shown in FIG. 4, a coupling hole 12a is formed concentrically in the tip portion of the intermediate lever 11 and tip portions of the exhaust rocker levers 8a, 8a, and coupling pistons 12b, 12c are arranged in the coupling hole 12a to be slidable in the axial direction and relatively movable in an axially orthogonal direction.

Further, one end face of the coupling piston 12b and one end of the coupling hole 12a form an oil pressure chamber 12e. A return spring 12f is disposed between the other end face of the coupling piston 12c and the other end of the coupling hole 12a with a stopper 12d being interposed therebetween. To the oil pressure chamber 12e, an oil pressure can be supplied via an oil pressure path 8d formed in the rocker shaft 8c.

When the oil pressure is supplied to the oil pressure chamber 12e, the coupling pistons 12c, 12b are located at positions crossing boundaries between the intermediate lever 11 and the exhaust rocker levers 8a (FIG. 4A), thereby turning to the EGR valve opening ON state. Then, when the oil pressure is released, contact portions between the coupling piston 12c and the coupling piston 12b and the stopper 12d match the boundaries (FIG. 4B), thereby turning to the EGR valve opening OFF state.

Moreover, the intake cam shaft 5 has an intake, cam phase variable system 15 capable of freely controlling the phase of the intake cam shaft 5. When the phase of the intake cam shaft 5 is changed, open/close times of the intake valves IN1, IN2 in an intake stroke change, and simultaneously, open/close times of the exhaust valves EX1, EX2 in the EGR valve opening operation also change by the same phase. Further, the exhaust cam shaft 6 has an exhaust cam phase variable system 16 capable of freely controlling the phase of the exhaust cam shaft 6.

The secondary air supply system 20 includes a secondary air supply path 21 connecting the surge tank 3e and the exhaust ports 1e of the respective cylinders in a communicative manner, secondary air control valves 22a to 22d interposed in the secondary air supply path 21, and an electric motor driven auxiliary supercharger 23 interposed upstream of the secondary air control valves in the secondary air supply path 21. In addition, numeral 23a denotes a drive motor, and numeral 24 denotes an intercooler which cools fresh air that is increased in temperature by compression.

The secondary air supply path 21 has a header part 21a extending in an arrangement direction of the cylinders, and branch pipes 21b arranged to open in the exhaust ports 1e of the respective cylinders from the header part 21a. The secondary air control valves 22 are interposed in the branch pipes 21b respectively.

A situation will be described in detail that secondary air and EGR gas are supercharged into the #1 cylinder (corresponding to a second cylinder of the present invention) using an exhaust blowdown pressure from the #4 cylinder (corresponding to a first cylinder of the present invention).

FIG. 5 shows lift curves EX, IN of the exhaust valves and the intake valves of the #1 cylinder and the #4 cylinder, lift curves C1 when the exhaust valves are opened again by the EGR valve opening system 9, and lift curves SA of the secondary air control valves. As shown in FIG. 5, the secondary air control valves open in the intake stroke of each cylinder, and the exhaust valves open near the intake stroke bottom dead center of each cylinder by the EGR valve opening system.

Further, FIG. 6 and FIG. 7 are characteristic graphs showing changes of a flow rate megr of the EGR gas into the cylinder bore (including the flow rate of the secondary air from the exhaust port side into the cylinder bore), a flow rate msa of the secondary air into the exhaust ports, a flow rate mex of exhaust gas into the exhaust ports, and a flow rate min of fresh air (intake air) into the cylinder bore according to the crank angle, as well as changes of an cylinder internal pressure Pcy, an exhaust port internal pressure Pex, and an intake port internal pressure Pin according to the crank angle. FIG. 6 shows characteristics of the secondary air control valves 22a to 22d when retained in a closed state, and FIG. 7 shows characteristics of the secondary air control valves when opened/closed at the aforementioned timings.

In the engine 1 of this embodiment, in a predetermined operation range (HCl operation range) in which the EGR gas should be supercharged, an oil pressure is supplied to the oil pressure chamber 12e of the above-described switching system 12, and the coupling pistons 12b, 12c move to positions of FIG. 4A. Thus, the EGR cam noses 5a' of the intake cam shaft 5 drive the exhaust valves EX1, EX2 to open or close. More particularly, when the lift portions 5c' of the EGR cam noses 5a' rock the exhaust rocker cams 10 via the rollers 10a, this rocking is transmitted to the intermediate lever 11 via the roller 13b to rock the exhaust rocker levers 8a together with the intermediate lever 11. Thus, the exhaust valves EX1, EX2 open or close along the EGR valve opening lift curves C1 shown in FIG. 5.

Incidentally, in an operation range in which supercharging of EGR gas is not performed, the supply of the oil pressure is stopped, the coupling piston 12b move to the position of FIG. 4B, and rocking of the intermediate lever 11 is not transmitted to the exhaust rocker levers 8a. Therefore, the exhaust valves do not perform the EGR valve opening/closing operation.

In this embodiment, the EGR valve opening system 9 does not operate at any time in a high-rotation range. Accordingly, valve acceleration by the EGR cams 5a' can be set high. The EGR cams 5a' have a narrow opening degree, but relatively high lift is set thereto, allowing a large amount of EGR gas to be introduced in a short time.

In this embodiment, the secondary air is supplied by the auxiliary supercharger 23 to the header part 21a at a higher pressure than the atmospheric pressure, for example at 1.2 bar to 1.8 bar. In the HCCI operation range in which EGR gas is supercharged, the secondary air control valve 22a of the #1 cylinder opens in the intake stroke of the #1 cylinder as shown by the secondary air control valve SA in FIG. 5, the compressed secondary air is supplied to the exhaust port 1e of the #1 cylinder (see the secondary air flow rate msa in FIG. 7), and the secondary air is stored in the exhaust port 1e. In this case, when the #1 cylinder approaches the intake bottom dead center, the exhaust valves of the #4 cylinder start to open near the expansion stroke bottom dead center, the exhaust blowdown pressure from the #4 cylinder is exhausted to the exhaust system, and this exhaust blowdown pressure proceeds to the #1 cylinder side (see FIG. 5) via the exhaust branch pipes 2d, 2a set to the certain lengths. At this time, for the #1 cylinder, the EGR valve opening system 9 opens the exhaust valves again near the intake stroke bottom dead center as shown by the EGR valve opening C1. The aforementioned exhaust blowdown pressure reaches the exhaust port of the #1 cylinder as shown at point a of the exhaust port internal pressure Pex in FIG. 7 at the same timing as re-opening of the exhaust valves, and the secondary air stored in the exhaust port and the EGR gas are pushed by this exhaust blowdown pressure into the cylinder bore 1a of the #1 cylinder. Then the internal pressure in the cylinder bore 1a at the beginning of the compression stroke in the #1 cylinder becomes higher than the internal pressure in the intake port 1d.

As shown in FIG. 6, during an overlap period of the intake valves and the EGR valve opening of the exhaust valves, the intake port internal pressure Pin is slightly higher than the exhaust port internal pressure Pex (see point d in FIG. 6) due to dynamic effects of the intake/exhaust pipes. Thus, a small amount of fresh air is supplied to the exhaust port via the cylinder bore (see point b of the EGR flow rate megr in FIG. 6). Incidentally, with the EGR flow rate megr, a positive side portion like the point b indicates flowing out of the cylinder side to the exhaust port, and a negative side portion like point e indicates flowing in from the exhaust port into the cylinder bore.

Further, as shown in FIG. 7, by opening of the secondary air control valve 22a of the #1 cylinder in an intake stroke, secondary air is introduced into the exhaust port 1e of the #1 cylinder and stored therein (see intake stroke of the secondary air flow rate msa in FIG. 7). By subsequent re-opening of the exhaust valves by the EGR valve opening system 9, the secondary air is introduced into the cylinder bore together with EGR gas (see the EGR gas flow rate megr in FIG. 7). Due to such addition of secondary air to fresh air, the amount of low-temperature air increases, and the high-temperature EGR gas is increased so that the increased low-temperature air becomes the temperature corresponding to compression ignition. Thus, in comparison with the case where no secondary air is introduced (see FIG. 6), the mass (thermal capacity) of in-cylinder air-fuel mixture increases, and G/F becomes large. As a consequence, the fuel injection amount restricted for suppressing NOx can be increased, and hence the torque can be increased. Incidentally, to secure the amount of high-temperature EGR gas needed for compression ignition, it is desirable that the exhaust path is narrowed by, for example, about ½ in cross-sectional area with the exhaust throttle valve 2h, to thereby increase the high-temperature EGR amount. However, narrowing the exhaust path area causes the pumping loss to increase slightly, and thus it is further desirable that the high-temperature EGR gas amount is secured by contriving the valve timing, such as lengthening the EGR open period of the exhaust valves.

Figure 8:
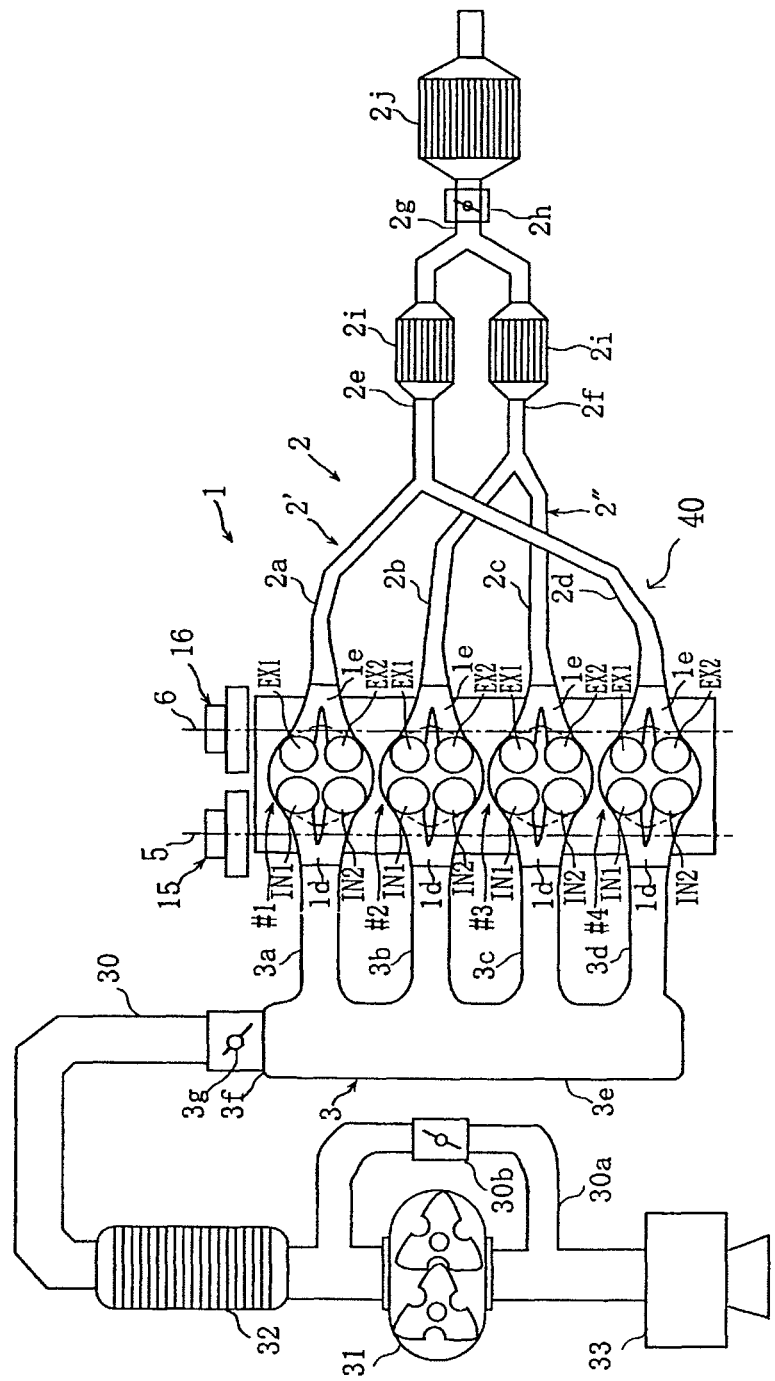
FIG. 8 is a schematic structural view of an engine of a second embodiment of the present invention.
Figure 9:
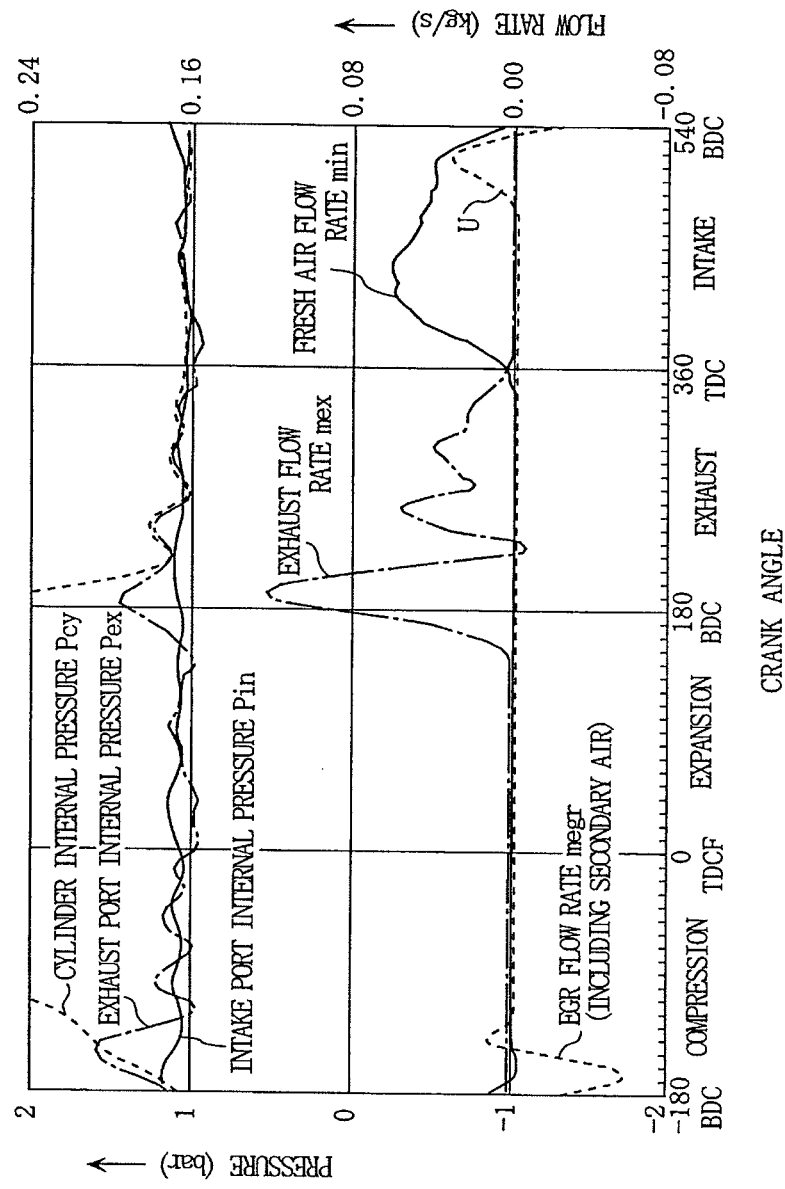
FIG. 9 is a characteristic graph of various pressures and flow rates of the engine of the second embodiment.
Figure 10:
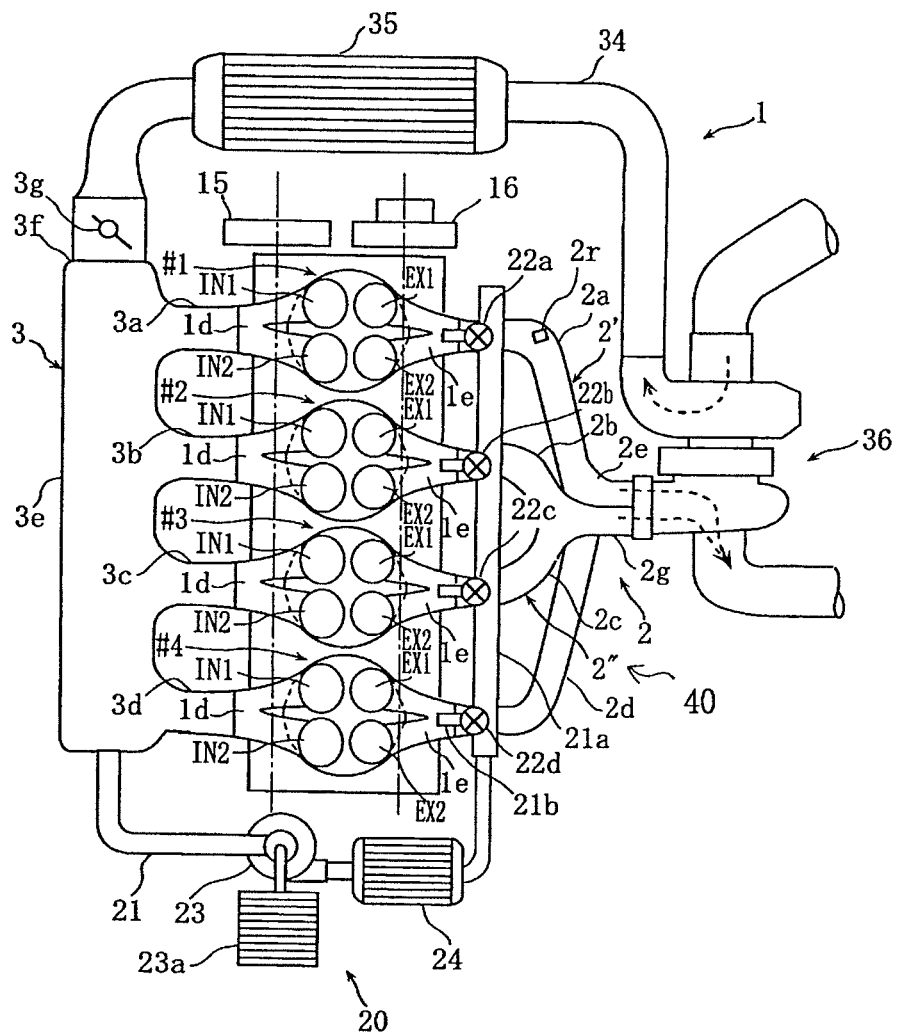
FIG. 10 is a schematic characteristic view of an engine of a third embodiment of the present invention.
Figure 11:
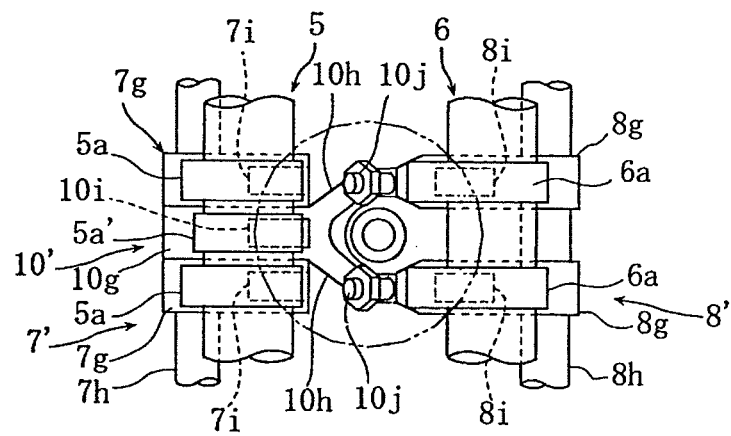
FIG. 11 is a schematic plan view of a valve device of the engine of the third embodiment.
Figure 12:
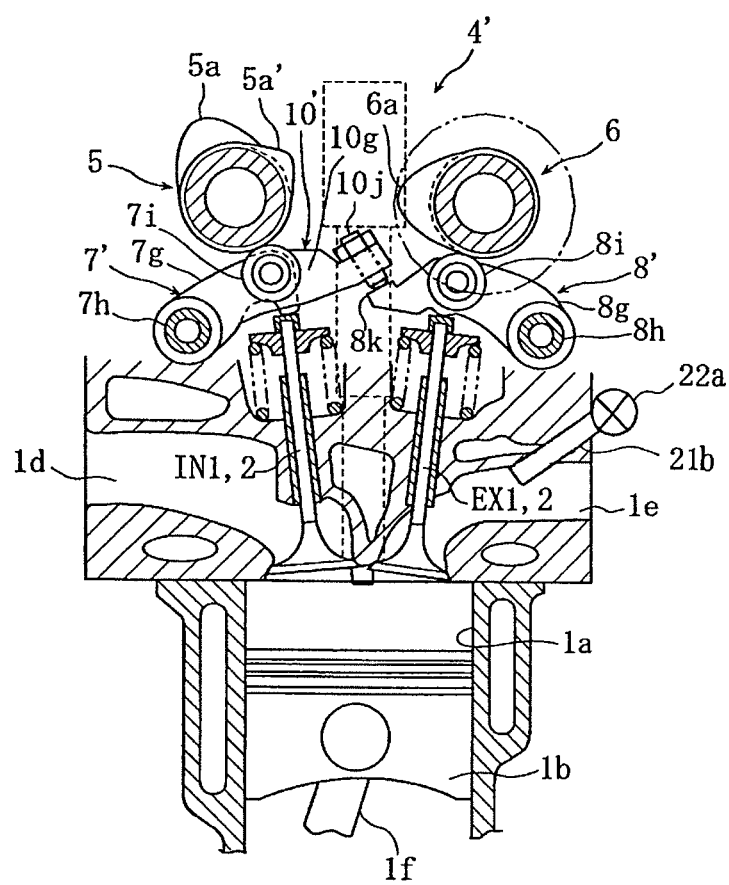
FIG. 12 is a cross-sectional side view of the engine of the third embodiment.

FIG. 8 and FIG. 9 are a view and a graph respectively for describing a four-stroke engine according to a second embodiment of the present invention. In the aforementioned first embodiment, the secondary air is compressed by the auxiliary supercharger and then supplied to the header part, and is further supplied to the exhaust port of each cylinder by opening/closing of the secondary air control valve. The second embodiment is an example in which fresh air is supplied to the exhaust port via the cylinder. In the drawings, the same reference numerals as in FIG. 1 denote the same or corresponding parts.

In middle of the air introduction path 30 connected to a surge tank 3e of an engine 1 of the second embodiment, a main supercharger 31 driven by an electric motor or engine output is interposed, so as to supply fresh air compressed at a predetermined pressure to the engine 1. In addition, numeral 30a denotes a bypass detouring the main supercharger 31, numeral 30b denotes a bypass valve which opens/closes the bypass 30a, numeral 32 denotes an intercooler which decreases the temperature of compressed fresh air, and numeral 33 denotes an air cleaner.

Compressed fresh air from the main supercharger 31 is introduced into the cylinder bore of the #1 cylinder from the intake port 1d by opening of the intake valves in an intake stroke of the #1 cylinder. Near the end of this intake stroke, there is an overlap period in which the intake valves are open and the exhaust valves are open by EGR valve opening. Moreover, also due to the introduced fresh air being in a compressed state, part of the fresh air flows through to the exhaust port 1e of the #1 cylinder from the exhaust valve openings via the cylinder. This fresh air flown through is stored in the exhaust port as secondary air (see positive part c of the EGR flow rate megr in FIG. 9).

In a state that the secondary air is thus stored in the exhaust port 1e of the #1 cylinder, the exhaust valves of the #4 cylinder start to open near the expansion stroke bottom dead center, and thereby an exhaust blowdown pressure in the #4 cylinder reaches the exhaust port 1e of the #1 cylinder via the exhaust pipes 2d, 2a set to the predetermined lengths while the exhaust valves are in the EGR valve opening state. By this blowdown pressure, the secondary air stored in the exhaust port 1e of the #1 cylinder is pushed into the cylinder bore of the #1 cylinder together with EGR gas.

In this second embodiment, by introducing the secondary air, the mass of in-cylinder air-fuel mixture increases more than in a simple supercharged engine in which fresh air is supercharged from the intake system just by the main supercharger 31, and thus the HCCI operation range can be widened while suppressing the mechanical loss.

Further, by allowing fresh air to flow through to the exhaust port 1e side via the cylinder bore by the main mechanical supercharger 31, and storing the fresh air flown through in the exhaust port 1e as secondary air, it is not necessary to have a special system for supplying the secondary air to the exhaust port in advance.

FIG. 10 to FIG. 13 are views for describing a third embodiment of the present invention. In these views, the same reference numerals as in FIG. 1 and FIG. 8 denote the same or corresponding parts.

In an engine 1 of the third embodiment, a merging pipe 2e of a first exhaust system 2' and a merging pipe 2g of a second exhaust system 2" are connected to a turbocharger 36 having one common variable nozzle turbine. An intercooler 35 is interposed in an air path 34 connecting an air discharge port of the turbocharger 36 and a surge tank 3e. Further, a pressure sensor 2r is disposed on an exhaust branch pipe 2a.

Further, the engine 1 of the third embodiment has a secondary air supply system 20 having the same structure as that of the above-described first embodiment. This secondary air supply system 20 includes a secondary air supply path 21 connecting the surge tank 3e and the exhaust ports 1e, an auxiliary supercharger 23 and an intercooler 24 interposed in the secondary air supply path 21, and secondary air control valves 22a to 22d.

Further, an intake valve drive system 7', an exhaust valve drive system 8', and an EGR valve opening system 10' of a valve device 4' of the engine 1 are structured as follows.

The intake valve drive system 7' drives the intake valves to open/close by pressing with intake cam noses 5a rollers 7i disposed on tip portions of intake rocker arms 7g supported rockably by an intake rocker shaft 7h.

Further, the exhaust valve drive system 8' drives the exhaust valves to open/close by pressing with exhaust cam noses 6a rollers 8i disposed on tip portions of exhaust rocker arms 8g supported rockably by an exhaust rocker shaft 8h.

The EGR valve opening system 10' is structured to press-drive with EGR cam noses 5a' rollers 10i disposed in middle portions of drive levers 10g rockably supported by the above intake rocker shaft 7h. The drive levers 10g each have bifurcated pressing pieces 10h, 10h, and are structured to press front end portions 8k, 8k of the exhaust rocker arms 8g, 8g by pressing pins 10j, 10j, which are screwed into the pressing pieces 10h, 10h in a manner that their positions can be adjusted in an axial direction.

In a turbocharged engine, in a period of turbo lag in which the rotational speed of the turbocharger is not sufficient, increase in the intake port internal pressure is delayed, and thus a delay occurs in increase of the intake air amount. Moreover, the exhaust pressure becomes higher than the intake pressure, and generation of torque is further delayed due to increase in residual gas and increase in pumping loss.

Figure 14:
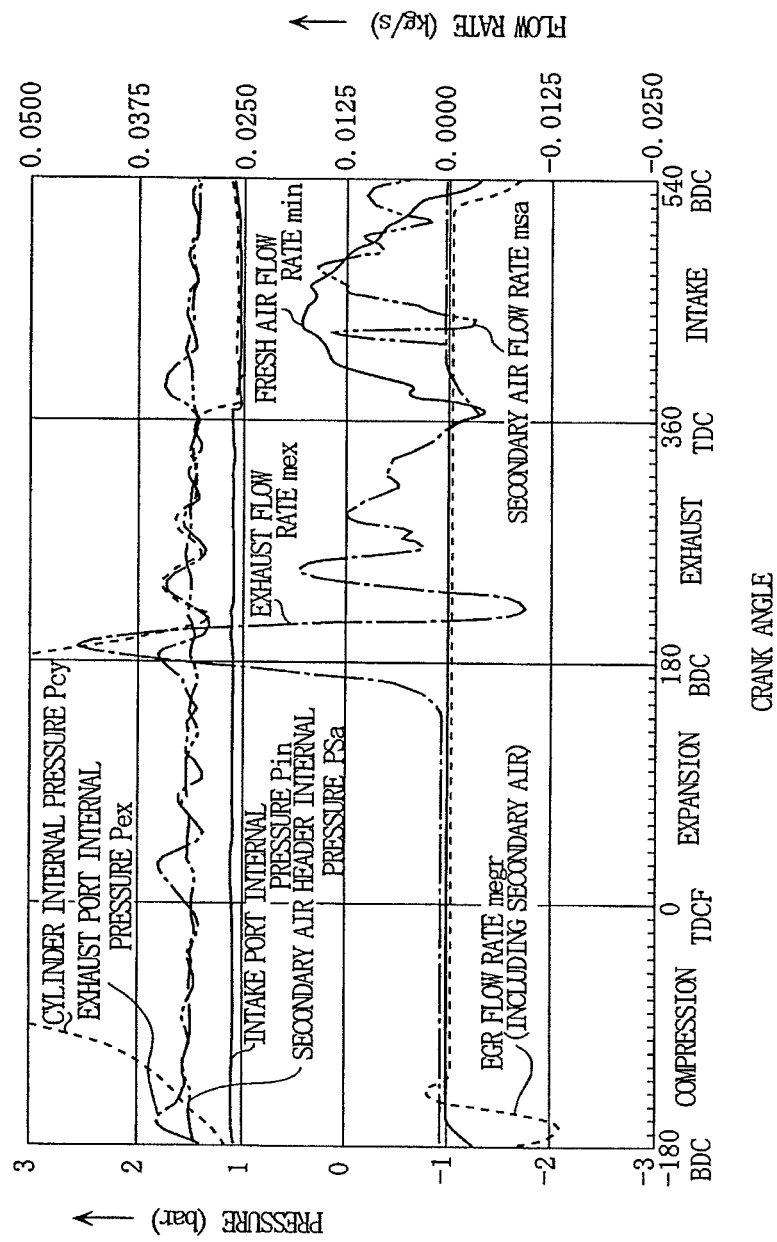
FIG. 14 is a characteristic graph of various pressures and flow rates of the engine of the third embodiment.

In the third embodiment, as shown by a secondary air header internal pressure Psa in FIG. 14, secondary air is supplied to the exhaust port 1e at a pressure of about 1.5 bar for example by the auxiliary supercharger 23, so as to supercharge EGR gas together with this secondary air by an exhaust blowdown pressure. Particularly, in the period of the turbo lag, the exhaust pressure is relatively high, and thus the secondary air can be supercharged into the cylinder bore from the exhaust port side more effectively using the exhaust blowdown pressure.

Thus, transient torque can be increased by increasing the fuel injection amount by the amount of secondary air increased in this manner. Consequently, turbine supercharging energy supplied to the turbocharger 36 increases, and rotation increase speed of the turbocharger 36 increases. Accordingly, the response of the turbocharger can be improved.

Incidentally, in a normal operation state in which the rotational speed of the turbocharger is high enough, driving of the auxiliary supercharger 23 may be stopped. In the normal operation state, the intake port pressure becomes higher than the exhaust port pressure, and thus fresh air is supplied to the exhaust ports 1e via the secondary air introduction path 21 while idle rotating the auxiliary supercharger 23. Consequently, the above-described torque increase effect is obtained even when the auxiliary supercharger 23 is stopped driving, and the low-speed torque increases.

Further, in the engine of the third embodiment, it is needed to set the exhaust pipe lengths of the first, second exhaust systems 2', 2" to such lengths that a primary pressure wave of blowdown gas from one cylinder reaches the exhaust port of another cylinder at a predetermined timing. Particularly in the second exhaust system 2", it is sometimes difficult to assure the required lengths. Accordingly, in the operation range in which the EGR gas supercharging is performed, it is desirable that the phase of the exhaust cam shaft 6 is delayed in angle larger than normal by the exhaust cam phase variable system 16. Incidentally, a cam phase variable system for the intake cam shaft 5 may be provided.

As described above, in the turbocharger 36 in the third embodiment, when performing a transient operation time such as starting acceleration, the turbine rotation is low and thus the exhaust pressure becomes automatically higher than the intake pressure. In such acceleration, when the variable nozzle is controlled in a closing direction, the exhaust pressure increases further. When the turbine rotation increases and gets close to a normal state, the intake pressure increases and controls the variable nozzle in an open direction, and thus the EGR introduction amount decreases to facilitate increase of output. Further, while starting or warming up, the variable nozzle is narrowed to be substantially totally closed, to be substituted for the exhaust throttles.

Figure 13:
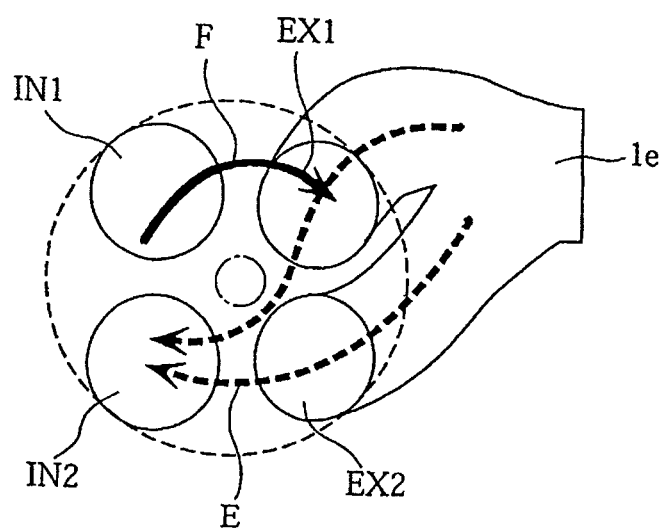
FIG. 13 is a schematic view showing an exhaust port shape of the engine of the third embodiment.

The exhaust ports 1e of this embodiment are tangential ports generating a swirl flow E flowing about the cylinder axis when EGR gas flows into the cylinder, as shown in FIG. 13. Considering striking a balance between reduction in resistance loss when exhaust gas flows out and a weak swirl when the EGR gas flows back, the tangential ports are more desirable than helical ports. Further, the turning direction of the swirl flow W by the EGR gas is the same as the turning direction of a swirl flow F generated by a fresh air flow from the intake valves.

Furthermore, in the engine 1 of this embodiment, it is possible to secure a compression temperature and a pressure required for combustion by supercharging EGR gas while increasing the exhaust pressure by narrowing the turbine nozzle while starting and warming up. This allows to set a low compression ratio, which is advantageous for HCCI operation. The narrowing amount of the turbine nozzle is controlled by feedback controlling the exhaust pipe pressure based on a signal of the pressure sensor 2r to make it close to a target value corresponding to the engine water temperature.

Note that in the above embodiments, although the complicated valve device and the variable systems thereof are set, the object of the invention can be achieved with a simple structure such that the EGR valve opening cams are added to exhaust cams of a normal valve device, as long as a certain degree of reduction in performance is tolerated.

Furthermore, in the first and third embodiments, the secondary air control valves are provided, and the control valves are set to open in an intake stroke, but when the flow rate of the auxiliary supercharger has an enough margin, it is possible to use simple one-way valves (check valves) in place of the control valves.

The invention claimed is:

1. A four-stroke engine structured to introduce fresh air and EGR gas into a cylinder, the four-stroke engine comprising:
a blowdown supercharging system using a combustion chamber internal pressure when exhaust valves open in an expansion stroke of a first cylinder to generate an exhaust blowdown pressure for introducing EGR gas into a second cylinder from near a bottom dead center of an intake stroke to near a bottom dead center of a compression stroke of the second cylinder which is different from the first cylinder in combustion timing; and
a secondary air supply system supplying secondary air to an exhaust port of the second cylinder prior to arrival of the exhaust blowdown pressure at the second cylinder, and
wherein the secondary air in the exhaust port and the EGR gas are supercharged into the second cylinder by the exhaust blowdown pressure from the first cylinder and the secondary air supply system comprises a secondary air supply path and secondary air control valves interposed in the secondary air supply path, wherein the secondary air supply path connects an intake system and the exhaust port of each cylinder in a communicative manner, and an auxiliary supercharger interposed upstream of the secondary air control valves in the secondary air supply path and driven by an electric motor or engine output.

2. The four-stroke engine according to claim 1, wherein:
the engine comprises an intake system in which a turbocharger driven by exhaust gas from the engine is interposed, and is structured to supply compressed fresh air at atmospheric pressure or higher into each cylinder at least in a high load operation range.

3. The four-stroke engine according to claim 1, wherein
in the blowdown supercharging system, an exhaust timing of the first cylinder and exhaust pipe lengths from the first cylinder to the second cylinder are set so that the exhaust blowdown pressure of the first cylinder arrives at the exhaust port of the second cylinder near an intake stroke bottom dead center of the second cylinder, and exhaust valves of the second cylinder are structured to open near the intake stroke bottom dead center of the second cylinder.

4. The four-stroke engine according to claim 2, wherein
in the blowdown supercharging system, an exhaust timing of the first cylinder and exhaust pipe lengths from the first cylinder to the second cylinder are set so that the exhaust blowdown pressure of the first cylinder arrives at the exhaust port of the second cylinder near an intake stroke bottom dead center of the second cylinder, and exhaust valves of the second cylinder are structured to open near the intake stroke bottom dead center of the second cylinder.

\* \* \* \* \*